US008728551B2

United States Patent
Noda et al.

(10) Patent No.: US 8,728,551 B2
(45) Date of Patent: May 20, 2014

(54) METHOD FOR PRODUCING FISH-SLICE-LIKE PASTE PRODUCT

(75) Inventors: Minoru Noda, Ishikawa (JP); Kazuki Tomiyama, Ishikawa (JP); Fumio Noda, Ishikawa (JP); Tetsuya Sugino, Ishikawa (JP)

(73) Assignee: Sugiyo Co., Ltd., Ishikawa (JP)

( * ) Notice: Subject to any disclaimer, the term of this patent is extended or adjusted under 35 U.S.C. 154(b) by 86 days.

(21) Appl. No.: 13/449,534

(22) Filed: Apr. 18, 2012

(65) Prior Publication Data

US 2012/0276244 A1 Nov. 1, 2012

(30) Foreign Application Priority Data

Apr. 27, 2011 (JP) ................................. 2011-100231

(51) Int. Cl.
*A23L 1/325* (2006.01)
(52) U.S. Cl.
USPC ............................................. 426/7; 426/643
(58) Field of Classification Search
CPC ... A23L 1/3053; A23L 1/3149; A23L 1/3177; A23L 1/3185; A23L 1/3252; A23L 1/3255; A23L 1/33; A23L 1/333
USPC ............... 426/7, 61, 641, 643, 104, 513, 574, 426/332, 56, 59, 657
See application file for complete search history.

(56) References Cited

FOREIGN PATENT DOCUMENTS

| EP | 2253229 | * | 9/2009 | ............... A23L 1/325 |
| JP | 2007-252218 | | 10/2007 | |
| WO | WO2007090916 | * | 8/2007 | ............... A23L 1/325 |

OTHER PUBLICATIONS

WO-2007-090916-Machine Translation.*

* cited by examiner

*Primary Examiner* — D. Lawrence Tarazano
*Assistant Examiner* — Hamid R Badr
(74) *Attorney, Agent, or Firm* — Renner, Otto, Boisselle & Sklar, LLP

(57) ABSTRACT

A method for producing a fish product according to the present invention includes: a step of combining and mixing at least 0.01 percent by weight up to but not including 0.05 percent by weight of a protein cross-linking enzyme with ground fish meat to prepare a first ground-fish-meat material paste; a step of combining and mixing at least 0.05 percent by weight up to but not including 1.0 percent by weight of the protein cross-linking enzyme with ground fish meat to prepare a second ground-fish-meat material paste; a step of laminating a first paste consisting of the first ground-fish-meat material paste, and a second paste consisting of the second ground-fish-meat material paste, to make a laminated material; and a step of heating the laminated material.

5 Claims, 1 Drawing Sheet

METHOD FOR PRODUCING FISH-SLICE-LIKE PASTE PRODUCT

This nonprovisional application claims priority under 35 U.S.C. §119(a) to Patent Application No. 2011-100231 filed in Japan on Apr. 27, 2011, the entire contents of which are hereby incorporated by reference.

FIELD OF THE INVENTION

The present invention relates to a method for producing a fish-slice-like paste product, which is made by laminating a plurality of layers of pastes that are made from ground fish meat and have different physical properties. More particularly, the present invention relates to a method for producing a fish-slice-like paste product that brings a feeling of satisfaction of eating a slice of real fish in terms of oral and visual sensations.

BACKGROUND ART

Conventionally, in order to obtain a fish meat processed food that is close to the external appearance and shape of a slice of real fish, Japanese Laid-Open Publication No. 2007-252218 (Patent Literature 1) proposes a fish meat processed food that is in a fish slice style, obtained by the following method.

A coloring agent is added to a mixed liquid with a main ingredient of flour, and the thus obtained mixture is baked to produce a sheet-like material. The sheet-like material is set into a mold container in a shape of a fish slice. A fish-meat mixed material prepared by mixing flaked fish meat and thickener is packed into the mold container in such a manner to laminate it on the sheet-like material. The mold container is heated to adhere the sheet-like material and the fish-meat mixed material at the laminating surfaces.

The fish meat processed food disclosed in Patent Literature 1 is a flour-based, fish-meat-laminated processed product that includes flour as a main ingredient and utilizes the adhesion ability owing to the heating of the flour. Thus, fish-meat-laminated processed products having an oral sensation and physical properties that are closer to those of real fish are desired.

CITATION LIST

Patent Literature

Patent Literature 1: Japanese Laid-Open Publication No. 2007-252218

SUMMARY OF THE INVENTION

Technical Problem

The present invention has been attained in consideration of the actual circumstances described above. It is an objective of the present invention to provide a method for producing a fish-slice-like paste product, the method allowing a fish-slice-like product closer to real fish to be obtained.

Further, it is another objective of the present invention to provide a method for producing a fish-slice-like paste product, which allows those with decreased mastication and deglutition abilities, such as the elderly, to eat easily and which brings a visual feeling of eating a slice of real fish.

Solution to Problem

Specifically, the present invention is characterized as follows.

A method for producing a fish-slice-like paste product according to the present invention comprises: a step of combining and mixing at least 0.01 percent by weight up to but not including 0.05 percent by weight of a protein cross-linking enzyme with ground fish meat to prepare a first ground-fish-meat material paste; a step of combining and mixing at least 0.05 percent by weight up to but not including 1.0 percent by weight of the protein cross-linking enzyme with ground fish meat to prepare a second ground-fish-meat material paste; a step of laminating a first paste consisting of the first ground-fish-meat material paste, and a second paste consisting of the second ground-fish-meat material paste, to make a laminated material; and a step of heating the laminated material.

The method for producing a fish-slice-like paste product according to the present invention further comprises: a step of combining and mixing at least 1.0 percent by weight up to but not including 2.0 percent by weight of the protein cross-linking enzyme with ground fish meat to prepare a third ground-fish-meat material paste; and a step of laminating a first paste consisting of the first ground-fish-meat material paste, a second paste consisting of the second ground-fish-meat material paste, and a third paste consisting of the third ground-fish-meat material paste in this order to make a laminated material.

The method for producing a fish-slice-like paste product according to the present invention further comprises: a step of coating an exterior of the first paste with the second paste; and a step of coating an exterior of the second paste with the third paste.

In the method for producing a fish-slice-like paste product according to the present invention, the protein cross-linking enzyme contained in the first ground-fish-meat material paste is at least 0.02 percent by weight up to but not including 0.04 percent by weight with respect to the ground fish meat; the protein cross-linking enzyme contained in the second ground-fish-meat material paste is at least 0.1 percent by weight up to but not including 0.5 percent by weight with respect to the ground fish meat; and the protein cross-linking enzyme contained in the third ground-fish-meat material paste is at least 1.2 percent by weight up to but not including 1.8 percent by weight with respect to the ground fish meat.

In the method for producing a fish-slice-like paste product according to the present invention, the protein cross-linking enzyme is at least one selected from the group consisting of transglutaminase, tyrosinase, and ascorbate oxidase.

A fish-slice-like paste product according to the present invention is obtained by the method for producing a fish-slice-like paste product according to the present invention.

Advantageous Effect of Invention

According to the present invention, comprised are: a step of combining and mixing at least 0.01 percent by weight up to but not including 0.05 percent by weight of a protein cross-linking enzyme with ground fish meat to prepare a first ground-fish-meat material paste; a step of combining and mixing at least 0.05 percent by weight up to but not including 1.0 percent by weight of the protein cross-linking enzyme with ground fish meat to prepare a second ground-fish-meat material paste; a step of laminating a first paste consisting of the first ground-fish-meat material paste, and a second paste consisting of the second ground-fish-meat material paste, to make a laminated material; and a step of heating the laminated material. Therefore, ground fish meat can be used as a main ingredient, and the gel strength of each layer can be changed by utilizing the protein cross-linking enzyme, and at the same time the adhesion ability between layers can be secured. Thereby, a fish-slice-like paste product, having an oral sensation and physical properties closer to those of natural fish, can be attained.

Further, adjustment of a mixing ratio of a protein cross-linking enzyme to be mixed with ground fish meat allows the degree of gelatinization of each layer to be adjusted. Thereby, a fish meat processed food can be obtained, which allows those with decreased mastication and deglutition abilities, such as the elderly, to eat easily and which brings a feeling of eating a slice of real fish in terms of an oral sensation and firmness as well.

These and other advantages of the present invention will become apparent to those skilled in the art upon reading and understanding the following detailed description with reference to the accompanying figures.

Figure 1:
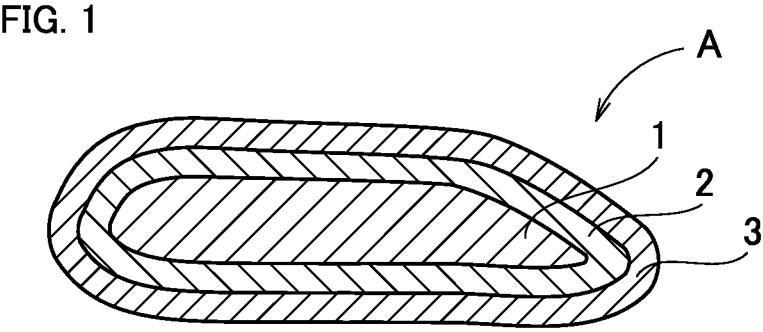
FIG. 1 is a cross sectional view of an example of a fish-slice-like paste product obtained by the method according to the present invention.

REFERENCE SIGNS LIST 1 first paste
2 second paste
3 third paste
4 fourth paste
A laminated material

DESCRIPTION OF THE PREFERRED EMBODIMENTS

Hereinafter, an embodiment of the present invention will be specifically described.

In the present invention, an appropriate amount of a protein cross-linking enzyme is combined and mixed with ground fish meat, and a plurality of ground-fish-meat material pastes having different content ratios of the protein cross-linking enzyme are prepared.

The ground fish meat used in the present invention refers to such meat that is collected from fish and then stirred and mixed. Preferably, stirred and mixed by-products or frozen ground meat of fish is used. The type of fish includes walleye pollack, cod, Atka mackerel, white croaker, lizardfish, sardine, scallop and the like, and the ground meat, by-products or the like of such fish and shellfish can be used. More than one of these materials can also be mixed and used.

The present invention comprises a step of combining and mixing at least 0.01 percent by weight up to but not including 0.05 percent by weight of a protein cross-linking enzyme with ground fish meat to prepare a first ground-fish-meat material paste; and a step of combining and mixing at least 0.05 percent by weight up to but not including 1.0 percent by weight of the protein cross-linking enzyme with ground fish meat to prepare a second ground-fish-meat material paste. Subsequently, a first paste consisting of the first ground-fish-meat material paste and a second paste consisting of the second ground-fish-meat material paste are laminated to make a laminated material.

For the laminating method, it is preferable to place a first paste 1 having a smaller content ratio of the protein cross-linking enzyme internally, and to coat the first paste 1 with a second paste 2 in such a manner to cover the first paste 1 as shown in FIG. 1.

In the present invention, it is also possible as needs arise to combine and mix at least 1.0 percent by weight up to but not including 2.0 percent by weight of the protein cross-linking enzyme with ground fish meat to prepare a third ground-fish-meat material paste, and to coat the surface of the second paste 2 with a third paste 3 consisting of the third ground-fish-meat material paste.

Figure 2:
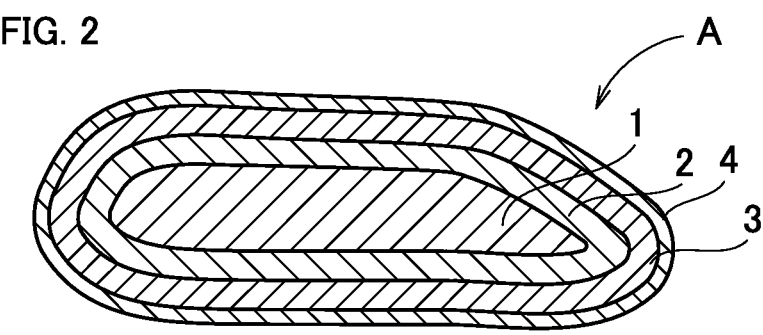
FIG. 2 is a cross sectional view of another example of a fish-slice-like paste product obtained by the method according to the present invention.
Figure 3:
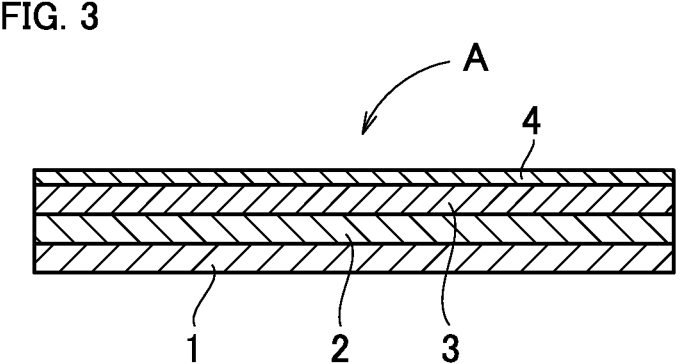
FIG. 3 is a cross sectional view of still another example of a fish-slice-like paste product obtained by the method according to the present invention.

Further, as shown in FIG. 2, it is also possible to use pastes having different content ratios of a protein cross-linking enzyme to laminate four layers or more. Further, as shown in FIG. 3, it is possible to laminate layers of respective pastes so that the layers will be parallel with each other. Further, it is possible to form a colored layer similar to a fish skin, as an outermost layer.

The thickness of each layer of paste can be optionally changed. In FIGS. 1 to 3, note that reference numeral 1 denotes a first paste, reference numeral 2 denotes a second paste, reference numeral 3 denotes a third paste, reference numeral 4 denotes a fourth paste, and reference numeral A denotes a laminated material.

A preferable content ratio of the protein cross-linking enzyme in each layer of ground fish meat is as described below.

As to the protein cross-linking enzyme contained in the first ground-fish-meat material paste, at least 0.02 percent by weight up to but not including 0.04 percent by weight is preferable with respect to the ground fish meat. As to the protein cross-linking enzyme contained in the second ground-fish-meat material paste, at least 0.1 percent by weight up to but not including 0.5 percent by weight is preferable with respect to the ground fish meat. As to the protein cross-linking enzyme contained in the third ground-fish-meat material paste, at least 1.2 percent by weight up to but not including 1.8 percent by weight is preferable with respect to the ground fish meat. If the content ratio of the protein cross-linking enzyme contained in each ground-fish-meat material paste that forms each layer is smaller than the corresponding range described above, then the degree of gelatinization will be too low, making the oral sensation of the thus obtained fish-slice-like paste product too soft. If the content ratio of the protein cross-linking enzyme contained in each ground-fish-meat material paste that forms each layer is greater than the corresponding range described above, then the degree of gelatinization will be too high, making the oral sensation of the thus obtained fish-slice-like paste product too hard.

The protein cross-linking enzyme includes transglutaminase, tyrosinase, and ascorbate oxidase, used either alone or in combination. Processing of ground fish meat using these enzymes allow the gel strength of a layer (paste) consisting of each ground-fish-meat material paste to be adjusted in accordance with the content ratio of the enzyme, and at the same time, allows the adhesion ability between layers of pastes to be secured. As a result, physical properties closer to those of natural fish can be attained.

Further, in addition to changing the content ratio of enzyme treatment combined with each of a plurality of laminated layers as described above, it is also possible to change the composition, producing method, or the like of the ground-fish-meat material paste in each layer, as will be described below:

(1) change in the type of fish used for ground fish meat in each layer;
(2) change in the grinding method (alkali treatment, low salt treatment, or the like) in preparing ground fish meat; and
(3) change in the content ratio of salt and the following materials.

In addition to the ground fish meat and the protein cross-linking enzyme, the fish-slice-like paste product obtained by the method according to the present invention may contain the following materials:

(1) isolated protein such as gelatin or collagen, soybean, wheat, soybean isolated protein, or vegetable protein such as wheat gluten;
(2) processed starch, konjak mannan, sugars, or the like;
(3) soybean milk, milk, condensed milk, powdered milk, coconut milk, broth, carrot, Angelica keiskei, or water content such as fruit juice of apple, grape or plum; and
(4) liquors, or seasonings such as stock.

The processed starch described above includes: esterified starch in which a free hydroxy group of glucose of starch constituent sugar is esterified; etherified starch in which the hydrogen atom of a hydroxy group is substituted by an alkyl group; crosslinked starch in which hydroxy groups of starch are coupled with each other; oxidized starch in which the reducing terminal of starch sugar is oxidized by an oxidizing agent, and the like.

For the esterified starch, *Matsutani Yuri* 8 and *Food Starch NE*1 of Matsutani Chemical Industry Co., Ltd. and *Chemistar* 210 of Glico Foods Co., Ltd. are preferably used. For the etherified starch, *Matsutani Yuri* 2 of Matsutani Chemical Industry Co., Ltd. and *Chemistar* 200 of Glico Foods Co., Ltd. are preferably used. For the crosslinked starch, *Perfect Oameal AC*75 of Matsutani Chemical Industry Co., Ltd. and *Chemistar* 420 of Glico Foods Co., Ltd. are preferably used. For the oxidized starch, *Chemistar* 10*T, Chemistar* 50*H* of Glico Foods Co., Ltd. and the like are preferably used.

The processed starch is used either alone or in combination, and the usage is preferably from 5 to 10 percent by weight with respect to a fish-slice-like paste product. The usage is more preferably from 6 to 9 percent by weight. If the usage of the processed starch is less than 5 percent by weight, then the obtained paste product is likely to have freezing denaturation. If the usage of the processed starch exceeds 10 percent by weight, then the obtained paste product tends to be hardened.

For the sugars described above, sugar, trehalose, oligosaccharide, sugar alcohol, starch syrup, or reduced starch syrup are preferably used. The usage thereof is preferably from 5 to 15 percent by weight. Particularly preferably usage of the sugars is from 5 to 12 percent by weight. If the usage of the sugars is less than 5 percent by weight, or if the usage exceeds 15 percent by weight, then water tends to be separated or the oral sensation tends to be reduced when the paste product is frozen.

The thus obtained plurality of pastes are laminated to form a laminated material, and subsequently the laminated material is heated to obtain a fish-slice-like paste product. The laminated material can be preserved by, for example, wrapping the surface of the laminated material with a wrapping film, cooking the material for 3 minutes where the center temperature is 75° C. or higher, peeling off the film and cooling the material at a room temperature, and then freezing the material by quick-freezing.

Moreover, a coloring material, such as squid ink, may be applied on the surface of the laminated material. The obtained paste product is normally vacuum packed and/or sterilized by heat and subsequently cooled. In order to cool the paste product, the paste product can be subjected to a high voltage electric field brine freezing treatment, for example. The paste product is preferably sealed hermetically with a film or the like. This is because the paste product is to be brine frozen, and because packaging of the paste product with a seasoning using a film or the like allows for subsequent defrosting and cooking to be performed simultaneously. Freezing of the product by providing a high voltage electric field allows the temperature of the fish-slice-like paste product, which is decreased during freezing, to pass the maximum ice crystal generating zone, from zero to −5° C., even faster. This suppresses the growth of ice crystals formed from water content in the raw material of the product, thereby preventing tissue destruction in the paste product. Accordingly, when the paste product is defrosted, the conditions of the raw material of the product can be maintained as those before the freezing.

EXAMPLES

Next, the present invention will be described more specifically on the basis of examples. However, note that the present invention is not limited by these examples.

Example 1

12 kg of ground walleye pollack meat, 3.6 g of transglutaminase ("Activa" of Ajinomoto Co., Inc) as a protein cross-linking enzyme, 1 kg of gluten powder, 0.4 kg of salt, 2 kg of trehalose, 2 kg of processed starch (product name: *Chemistar* 300*S* of Glico Foods Co., Ltd.), 0.3 kg sweet cooking rice wine, and 12 kg cold water were mixed, and the mixture was kneaded using a Stephan cutter to obtain a first ground-fish-meat material paste.

Except for the combined amount of 24 g of the protein cross-linking enzyme, the respective materials were mixed similarly to the case of the first ground-fish-meat material paste described above, to obtain a second ground-fish-meat material paste.

Except for the combined amount of 180 g of the protein cross-linking enzyme, the respective materials were mixed similarly to the case of the first ground-fish-meat material paste described above, to obtain a third ground-fish-meat material paste.

Subsequently, the first ground-fish-meat material paste was shaped into a fish slice shape to obtain a first paste. The surface of the first paste was covered by a sheet-like second paste consisting of the second ground-fish-meat material paste, and the surface of the second paste was covered by a sheet-like third paste consisting of the third ground-fish-meat material paste, thus forming a laminated material of three layers as shown in FIG. 1.

Subsequently, the laminated material was heated for 30 minutes at 90° C. to obtain a fish-slice-like paste product.

Example 2

After defrosting 12 kg of ground walleye pollack meat that had been frozen at sea, 3 g of tyrosinase as a protein cross-linking enzyme, 6 kg of starch, 0.4 kg of salt, 0.2 kg of seasoning, and 12 kg of cold water were mixed with the ground fish meat. The mixture was kneaded using a Stephan cutter to obtain a first ground-fish-meat material paste.

Except for the combined amount of 24 g of the protein cross-linking enzyme, the respective materials were mixed similarly to the case of the first ground-fish-meat material paste described above, to obtain a second ground-fish-meat material paste.

Except for the combined amount of 180 g of the protein cross-linking enzyme, the respective materials were mixed similarly to the case of the first ground-fish-meat material paste described above, to obtain a third ground-fish-meat material paste.

Subsequently, the first ground-fish-meat material paste was shaped into a fish slice shape to obtain a first paste. The surface of the first paste was covered by a sheet-like second paste consisting of the second ground-fish-meat material paste, and the surface of the second paste was covered by a sheet-like third paste consisting of the third ground-fish-meat material paste, thus forming a laminated material of three layers as shown in FIG. 1.

Subsequently, the laminated material was heated for 30 minutes at 90° C. to obtain a fish-slice-like paste product.

Comparative Example 1

Except for not combining the protein cross-linking enzyme, a ground-fish-meat material paste was obtained similarly to Example 1. The ground-fish-meat material paste was shaped into a fish slice shape, and subsequently the shaped material was heated for 30 minutes at 90° C. to obtain a fish-slice-like paste product.

(Evaluation Method)

Next, utilizing a sensual evaluation using a panel, the fish-slice-like paste products obtained in Examples 1 and 2 as well as the fish-slice-like paste product obtained in Comparative Example 1 were compared for evaluation.

With the fish-slice-like paste product obtained in Comparative Example 1 as a control, the judgment was conducted with 10 panel members evaluating the products using categories of Excellent: the visual and oral sensations and firmness are by far better than the control; Good: the visual and oral sensations and firmness are a little better than the control; Fair: the visual and oral sensations and firmness are almost the same as the control; Failure: the visual and oral sensations and firmness are not as good as the control, and a conclusion was made from the largest number of evaluation.

As a result, it was evaluated that the fish-slice-like paste products obtained in Examples 1 and 2 had oral sensations remarkably closer to that of a real fish slice compared to the fish-slice-like paste product obtained in Comparative Example 1.

INDUSTRIAL APPLICABILITY

The present invention can provide a method for producing a fish-slice-like paste product, the method allowing a fish-slice-like product closer to a real fish to be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a fish product, wherein the fish product resembles a slice of natural fish in appearance and texture, the method comprising:
   a step of combining and mixing at least 0.01 percent by weight up to but not including 0.05 percent by weight of a protein cross-linking enzyme with ground fish meat to prepare a first ground-fish-meat material paste;
   a step of combining and mixing at least 0.05 percent by weight up to but not including 1.0 percent by weight of the protein cross-linking enzyme with ground fish meat to prepare a second ground-fish-meat material paste;
   a step of combining and mixing at least 1.0 percent by weight up to but not including 2.0 percent by weight of the protein cross-linking enzyme with ground fish meat to prepare a third ground-fish-meat material paste;
   a step of laminating a first paste consisting of the first ground-fish-meat material paste, a second paste consisting of the second ground-fish-meat material paste, and a third paste consisting of the third ground-fish-meat material paste in this order, to make a laminated material; and
   a step of heating the laminated material.

2. The method for producing a fish product according to claim 1, further comprising:
   a step of coating an exterior of the first paste with the second paste; and
   a step of coating an exterior of the second paste with the third paste.

3. The method for producing a fish product according to claim 1, wherein:
   the protein cross-linking enzyme contained in the first ground-fish-meat material paste is at least 0.02 percent by weight up to but not including 0.04 percent by weight with respect to the ground fish meat;
   the protein cross-linking enzyme contained in the second ground-fish-meat material paste is at least 0.1 percent by weight up to but not including 0.5 percent by weight with respect to the ground fish meat; and
   the protein cross-linking enzyme contained in the third ground-fish-meat material paste is at least 1.2 percent by weight up to but not including 1.8 percent by weight with respect to the ground fish meat.

4. The method for producing a fish product according to claim 1, wherein the protein cross-linking enzyme is at least one selected from the group consisting of transglutaminase, tyrosinase, and ascorbate oxidase.

5. A fish product obtained by the method for producing a fish product according to claim 1.

* * * * *